(No Model.)
T. ROBERT.
SAW GUIDE.
No. 425,085. Patented Apr. 8, 1890.
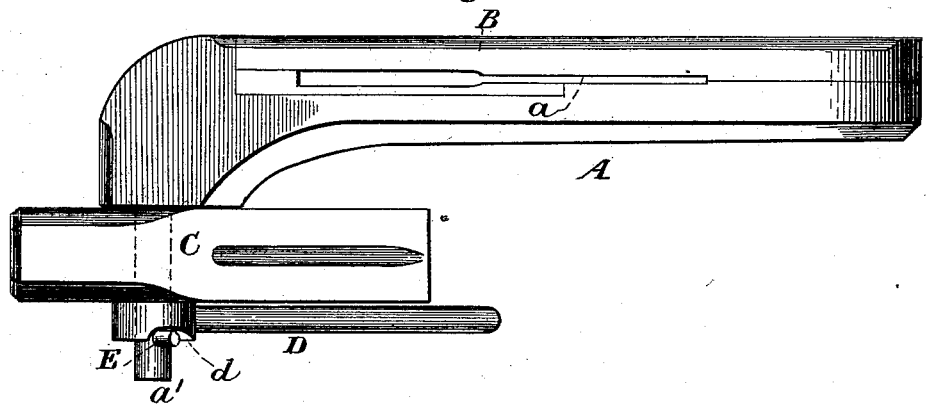
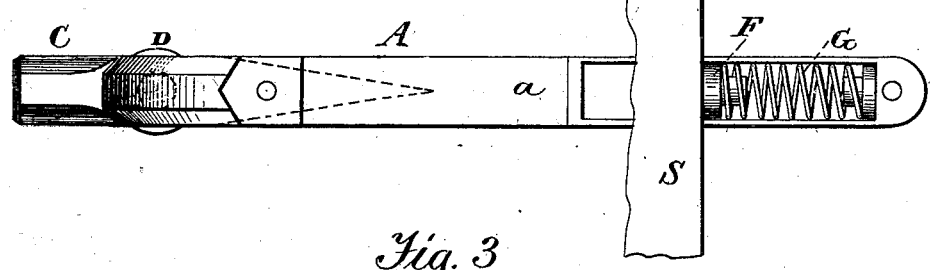
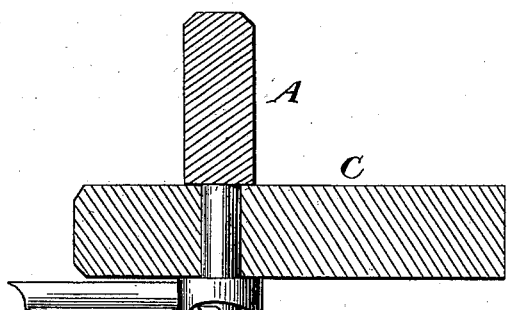
Witnesses.
A. Ruppert,
G. B. Towles.
Inventor.
Toussaint Robert
Per
Thomas P. Simpson
Atty.

UNITED STATES PATENT OFFICE.

TOUSSAINT ROBERT, OF EADONIA, WASHINGTON.

SAW-GUIDE.

SPECIFICATION forming part of Letters Patent No. 425,085, dated April 8, 1890.

Application filed June 27, 1889. Serial No. 315,712. (No model.)

*To all whom it may concern:*

Be it known that I, TOUSSAINT ROBERT, a citizen of the United States, residing at Eadonia, in the county of Lewis and Territory of Washington, have invented certain new and useful Improvements in Saw-Guides; and I do declare the following to be a full, clear, and exact description of the invention, such as will enable others skilled in the art to which it appertains to make and use the same, reference being had to the accompanying drawings, and to the letters of reference marked thereon, which form a part of this specification.

The special object of the invention is to make a saw-guide by which one man may saw down trees without the assistance of any other person.

Figure 1 of the drawings is a side elevation of my saw-guide; Fig. 2, a plan view with the removable top detached, and Fig. 3 a vertical cross-section.

In the drawings, A represents the saw-holder with the slot $a$, in which the saw-blade is supported as it moves back and forth across the tree. It is also provided with the subjacent pin $a'$, which passes through the wedge C and the clamp D. Near the end of this pin $a'$ is made a diametrical hole, through which passes the cross-pin E, and against the latter works the cam $d$ on the clamp D, so as to lock the parts A C D together.

In order to use my saw-guide, the wedge C is first driven into the body of the tree, so as to bring the saw-holder A to the exact height at which the tree is to be sawed off. Then the saw-holder A is turned into the desired position and the parts A C D locked together. The saw-blade S is now placed with its front end in the slot $a$, with its back against the plunger F, and its teeth on the tree. The plunger is pressed forward against the saw-blade by the spiral spring G, so as to hold the blade to the tree and feed it up as it cuts, the operator alternately pulling and pushing the saw across the tree in the usual way.

The plunger and spring may be easily inserted or removed by detaching the top piece B, while the slot $a$ may be faced with metal to decrease friction and lessen wear.

With my invention one man can do the work of two as ordinarily done.

What I claim as new, and desire to protect by Letters Patent, is—

The saw-holder A, having slot $a$ and pin $a'$, the wedge C, the clamp D, having cam $d$, the cross-pin E, and the spring-plunger F, arranged in groove $a$, all combined and arranged as and for the purpose set forth.

In testimony whereof I affix my signature in presence of two witnesses.

TOUSSAINT ROBERT.

Witnesses:
LUCY DENNY,
G. W. DENNY.